United States Patent Office 3,449,388
Patented June 10, 1969

3,449,388
TRANSITION METAL COMPLEXES OF SUBSTITUTED DIMERCAPTOMETHYLENES
Sheldon N. Lewis, Willow Grove, and George A. Miller, Glenside, Pa., assignors to Rohm & Haas Company, Philadelphia, Pa., a corporation of Delaware
No Drawing. Filed June 9, 1966, Ser. No. 556,280
Int. Cl. C07f 15/00; A01n 9/12
U.S. Cl. 260—429.9                                7 Claims

ABSTRACT OF THE DISCLOSURE

This invention relates to novel transition metal complexes of substituted 1,1-dimercaptomethylenes having the following general formula $$M'_n[M(S_2C=X)_y]$$

wherein:
X is the group nitromethylene ($CHNO_2$), dicyanomethylene ($C(CN)_2$), cyanocarboethoxymethylene $$(C(CN)CO_2C_2H_5)$$

cyanocarboxamidomethylene ($C(CN)CONH_2$), dicarboethoxymethylene ($C(CO_2C_2H_5)_2$), dicarboxamidomethylene ($C(CONH_2)_2$), or iminocyano (N—CN);
M is zinc, copper, nickel, cobalt, iron, or chromium;
M' is hydrogen, cobalt, copper, manganese, nickel, potassium, zinc, or tetralkylammonium wherein the alkyl contains 1 to 8 carbon atoms;
Y is the integer 2 or 3; and
n is an integer from 1 to 3, and to the use of these compounds in fungicidal compositions.

---

This invention is concerned with derivatives of 1,1-dimercaptomethylenes as new compositions of matter. More particularly, this invention is concerned with transition metal chelates of 1,1-dimercaptomethylene derivatives, and their tetraalkylammonium, alkali, and transition metal salts. Further, this invention relates to fungicidal compositions. More particularly, this invention relates to fungicidal compositions containing the 1,1-dimercaptomethylene derivatives as the active ingredients. Further still, this invention deals with methods for controlling bacterial and fungal diseases of plant life.

Due to the ever growing demand for food throughout the world, there has been a constant search by researchers for chemicals which will aid in the production of agronomic crops. A problem constantly faced by those engaged in crop production has been the deleterious effect of various microorganisms on such plants. Certain bacteria and fungi are particularly destructive in this respect. The novel compounds of this invention have exhibited outstanding biocidal properties, and in this regard, have proven to be especially effective against a wide variety of crop destructive bacteria and fungi. While demonstrating exceptional control of certain noxious microorganisms, the novel 1,1-dimercaptomethylene derivatives have not exhibited any substantial phytotoxic effect on the agronomic plants themselves. Compounds of this invention represent, therefore, an important step forward in the science of agricultural pesticides.

The novel compounds of this invention may be represented by the general formula $$M'_n[M(S_2C=X)_y]$$

wherein:
X is the group nitromethylene ($CHNO_2$), dicyanomethylene ($C(CN)_2$), cyanocarboethoxymethylene $$(C(CN)CO_2C_2H_5)$$

cyanocarboxamidomethylene ($C(CN)CONH_2$), dicarboethoxymethylene ($C(CO_2C_2H_5)_2$), dicarboxamidomethylene ($C(CONH_2)_2$), or iminocyano (N—CN);
M is zinc, copper, nickel, cobalt, iron, or chromium;
M' is hydrogen, cobalt, copper, manganese, nickel, potassium, zinc, or tetraalkylammonium wherein the alkyl contains 1 to 8 carbon atoms;
Y is the integer of 2 or 3; and
n is an integer from 1 to 3.

Tetramethylammonium, tetraethylammonium, tetrapropylammonium, tetrabutylammonium, tetrahexylammonium, trimethylbenzylammonium and choline are typical of the tetraalkylammoniums utilized within this invention. Clearly, the above enumerated tetraalkylammoniums are by no means exhaustive but merely representative of those within the gamut of this invention.

Typical embodiments of this invention include the following:

tetrabutylammonium bis-(2-nitroethylene-1,1-dithiolato)-Zn(II)
tetrapropylammonium bis-(2-nitroethylene-1,1-dithiolato)-Zn(II)
trimethyl(2-hydroxyethyl)ammonium bis-(2-nitroethylene-1,1-dithiolato)-Ni(II)
tetrabutylammonium bis-(2-nitroethylene-1,1-dithiolato)-Cu(II)
tetrabutylammonium tris-(2-nitroethylene-1,1-dithiolato)-Cr(III)
cobalt bis-(2-nitroethylene-1,1-dithiolato)-Co(II)
zinc bis-(2-nitroethylene-1,1-dithiolato)-Zn(II)
copper bis-(2-nitroethylene-1,1-dithiolato)-Cu(II)
copper bis-(2-nitroethylene-1,1-dithiolato)-Zn(II)
zinc bis-(2-nitroethylene-1,1-dithiolato)-Cu(II)
manganese bis-(2-nitroethylene-1,1-dithiolato)-Mn(II)
manganese bis-(2-nitroethylene-1,1-dithiolato)-Zn(II)
potassium bis-(2-nitroethylene-1,1-dithiolato)-Ni(II)
zinc nitrodithioacetate
potassium bis-(2,2-dicyanoethylene-1,1-dithiolato)-Zn(II)
copper bis-(2,2-dicyanoethylene-1,1-dithiolato)-Cu(II)
tetrabutylammonium bis-(2,2-dicyanoethylene-1,1-dithiolato)-Zn(II)
trimethyl(2-hydroxyethyl)ammonium bis-(2,2-dicyanoethylene-1,1-dithiolato)-Cu(II)
tetrabutylammonium bis-(2,2-dicyanoethylene-1,1-dithiolato)-Ni(II)
trimethylbenzylammonium bis-(2,2-dicyanoethylene-1,1-dithiolato)-Co(II)
tetrabutylammonium tris-(2,2-dicyanoethylene-1,1-dithiolato)-Cr(III)
trimethylbenzylammonium tris-(2,2-dicyanoethylene-1,1-dithiolato)Fe(III)
tetrabutylammonium bis-(2-cyano-2-carboethoxyethylene-1,1-dithiolato)-Zn(II)
tetrapropylammonium bis-(2-cyano-2-carboethoxyethylene-1,1-dithiolato)-Zn(II)
tetrapropylammonium bis-(2-cyano-2-carboxamidoethylene-1,1-dithiolato)-Zn(II)
tetrapropylammonium bis-(2,2-dicarboethoxyethylene-1,1-dithiolato)-Zn(II)
tetrabutylammonium bis-(2,2-dicarboethoxyethylene-1,1-dithiolato)-Zn(II)
copper bis-(2,2-dicarboethoxyethylene-1,1-dithiolato)-Cu(II)
zinc bis-(2,2-dicarboethoxyethylene-1,1-dithiolato)-Zn(II)
copper bis-(2,2-dicarboethoxyethylene-1,1-dithiolato)-Ni(II)
tetrapropylammonium bis-(2,2-dicarboxamidoethylene-1,1-dithiolato)-Cu(II)
tetrabutylammonium bis-(2,2-dicarboxamidoethylene-1,1-dithiolato)Zn(II)

zinc bis-(2,2-dicarboxamidoethylene-1,1-dithiolato)-Zn(II)

copper bis-(2,2-dicarboxamidoethylene-1,1-dithiolato)-Ni(II)

tetrabutylammonium bis-(N-cyanoiminodithiocarbonato)-Zn(II), and tetrapropylammonium bis-(N-cyanoiminodithiocarbonato)-Zn(II)

Preferred compounds of this invention include the following:

tetrabutylammonium bis-(2-nitroethylene-1,1-dithiolato)-Zn(II)

zinc bis-(2-nitroethylene-1,1-dithiolato)-Zn(II)

copper bis-(2-nitroethylene-1,1-dithiolato)-Cu(II)

potassium bis-(2,2-dicyanoethylene-1,1-dithiolato)-Zn(II)

tetrabutylammonium bis-(2-cyano-2-carboethoxyethylene-1,1-dithiolato)-Zn(II), and tetrapropylammonium bis-(2-cyano-2 - carboethoxyethylene-1,1-dithiolato)-Zn(II).

The novel compounds of this invention are derived from dipotassium salts of 1,1-dimercaptomethylenes such as for example: dipotassium 1,1-dithio-2-nitroethylene, dipotassium 1,1-dithio-2,2-dicyanoethylene, dipotassium 1,1-dithio-2-cyano-2-carboethoxyethylene, dipotassium 1,1-dithio-2 - cyano-2 - carboxamidoethylene and dipotassium N-cyano-iminodithiocarbonate. Such salts are well known in the art and may be prepared by various means. Typical preparations for such dipotassium salts are as follows:

DIPOTASSIUM SALT A

Preparation of dipotassium 1,1-dithio-2-nitroethylene.—In 100 ml. of absolute ethanol there was mixed 40 g. (0.65 mole) of nitromethane and 76 g. (1.0 mole) of carbon disulfide. To this solution there was slowly added at 35° C. a solution comprising 80 g. (1.42 mole) of (85%) potassium hydroxide in 500 ml. of absolute ethanol. A brown-red precipitate formed immediately. Upon completion of the above addition, the reaction mixture was filtered and the resulting precipitate was washed with ethanol and then ether. In this manner, 100 g. of dipotassium 1,1-dithio-2-nitroethylene was obtained having a neutralization equivalent (HClO$_4$) of 113 (107 theoretical).

DIPOTASSIUM SALT B

Preparation of dipotassium 1,1-dithio-2,2-dicyanoethylene.—In 600 ml. of anhydrous ethanol there was dissolved 132 g. (2.0 mole) of (85%) potassium hydroxide. This solution was then added at 25° to 30° C. over two hours to a solution comprising 66 g. (1.0 mole) of malononitrile and 76 g. (1.0 mole) of carbon disulfide in 200 ml. of ethanol. A tan precipitate formed immediately. After addition the reaction was stirred for one hour whereupon the precipitate was filtered and washed with ethanol and ether. In this manner, 211 g. of light orange dipotassium 1,1-dithio-2,2-dicyanoethylene was obtained having a neutralization equivalent (HClO$_4$) of 113 (theoretical 109).

DIPOTASSIUM SALT C

Preparation of dipotassium 1,1-dithio-2-cyano-2-carboethoxyethylene.—In a manner similar to that outlined in the preparation of Dipotassium Salt B, there was reacted 22.6 g. (0.2 mole) of ethyl cyanoacetate, 15.2 g. (0.2 mole) of carbon disulfide, and 26.4 g. (0.4 mole) of (85%) potassium hydroxide. After filtration and washing there was obtained 46.8 g. (88% yield) of yellow solid dipotassium 1,1-dithio-2-cyano-2-carboethoxyethylene having a neutralization equivalent (HClO$_4$) of 133 (theoretical 132.5).

DIPOTASSIUM SALT D

Preparation of dipotassium 1,1-dithio - 2 - cyano-2-carboxamidoethylene.—In 100 ml. of anhydrous ethanol there was mixed 16.8 g. (0.2 mole) of 2-cyanoacetamide and 15.2 g. (0.2 mole) of carbon disulfide. To this slurry was added at 25° C. with rapid stirring 26.4 g. (0.4 mole) of (85%) potassium hydroxide in 150 ml. of ethanol. After overnight stirring the slurry turned milky green. Filtration and drying resulted in 35.4 g. of powdery yellow dipotassium 1,1-dithio-2-cyano-2 - carboxamidoethylene having a neutralization equivalent (HClO$_4$) of 119.5 (theoretical 118).

DIPOTASSIUM SALT E

Preparation of dipotassium N - cyanoiminodithiocarbonate.—In a manner similar to that outlined in the preparation of Dipotassium Salt B, there was reacted 4.2 g. (0.1 mole) of cyanamide, 7.6 g. (0.1 mole) of carbon disulfide, and 13.2 g. (0.2 mole) of (85%) potassium hydroxide. After filtration and washing there was obtained 15.6 g. of light yellow solid dipotassium N-cyanoiminodithiocarbonate having a neutralization equivalent (HClO$_4$) of 99 (theoretical 92).

The novel compounds of this invention will be more thoroughly understood from the following examples which are offered by way of illustration and not by way of limitation. Table I shows the substituents of Examples 1 to 27 along with their physical characteristics. Table II gives the empirical formula and analytical data for Examples 1 to 27.

Examples 1 to 5

In 50 ml. of ethanol there was dissolved 0.05 mole of the tetraalkylammonium halide. To this solution was added 5.4 g. (0.025 mole) of dipotassium 1,1-dithio-2-nitroethylene in 30 ml. of water. Sufficient ethanol was added to give a clear solution. A metal acetate (0.025 mole) in 50 ml. of water was added to the above solution. The tetraalkylammonium transition metal chelates precipitated and were collected by filtration after cooling of the reaction mixture. Thereafter, they were recrystallized from an appropriate solvent. Yields of 80 to 90% were obtained in this manner.

Examples 6 to 12

To a solution of 5.4 g. (0.025 mole) of dipotassium 1,1-dithio-2-nitroethylene in 30 ml. of water, there was added over a few minutes at 25° C. a solution of 0.0125 mole of metal acetate in 30 ml. of water. Thereafter, a second solution of metal acetate (0.0125 mole) in 30 ml. of water wherein the metal was the same or different than the first was added slowly to the reaction solution. Precipitation occurred during this second addition and the solid product was finally obtained by filtration of the reaction mixture. Yields of 50 to 60% were obtained in this manner.

Example 13

To a solution of 5.4 g. (0.025 mole) of dipotassium 1,1-dithio-2-nitroethylene in 40 ml. of water there was added a solution of 3.12 g. (0.0125 mole) of nickelous acetate tetrahydrate in 30 ml. of water. A dark precipitate formed at once. Filtration of the reaction mixture yielded 2.1 g. of potassium bis-(2-nitroethylene-1,1-dithiolato)-Ni(II).

Example 14

To a solution of 5.4 g. (0.025 mole) of dipotassium 1,1-dithio-2-nitroethylene in 25 ml. of water there was added 16.5 ml. (0.025 mole) of 1.51 M hydrochloric acid. To this solution there was added a solution of 2.75 g. (0.0125 mole) of zinc acetate dihydrate in 25 ml. of water. After cooling and filtration a yield of 2.6 g. of red solid zinc nitrodithioacetate was obtained.

Example 15

In 60 ml. of water there was dissolved 10.9 g. (0.05 mole) of dipotassium 1,1-dithio-2,2-dicyanoethylene. To the above solution there was quickly added 5.50 g. (0.025 mole) of zinc acetate dihydrate in 40 ml. of water. After cooling overnight and filtration thereafter, 6.5 g. of tan colored potassium bis - (2,2-dicyanoethylene-1,1-dithiolato)-Zn(II) was obtained.

Example 16

To a solution of 8.7 g. (0.0385 mole) dipotassium 1,1-dithio-2,2-dicyanoethylene in 100 ml. of water was added 7.0 g. (0.0385 mole) of anhydrous copper acetate in 100 ml. of water. A heavy red-brown precipitate formed which was then filtered, washed with water and acetone, and dried. In this manner, 6.5 g. of copper bis-(2,2-dicyanoethylene-1,1-dithiolato)-Cu(II) was obtained.

Examples 17 to 22

In 50 ml. of water there was dissolved 5.3 g. (0.025 mole) of dipotassium 1,1-dithio-2,2-dicyanoethylene. A solution of 0.05 mole of tetraalkylammonium halide in 50 ml. of ethanol was quickly added to the above solution. To this solution was then added 0.0125 mole of metal acetate in 25 ml. of water. A precipitate formed immediately, and after addition the solid product was isolated by filtration and recrystallized from an appropriate solvent. In this manner, yields of 80 to 90% were obtained.

Examples 23 to 27

The compounds of Examples 23 to 27 were obtained by following the procedure described for Examples 17 to 22, the only difference therein being the substitution of the dipotassium salts—dipotassium 1,1-dithio-2-cyano-2-carboethoxyethylene, dipotassium 1,1-dithio-2-cyano-2-carboxamidoethylene and dipotassium N-cyanoiminodithiocarbonate—in place of 1,1-dithio-2,2-dicyanoethylene. Yields of 80 to 90% were obtained in this manner.

TABLE I. EXAMPLE SUBSTITUENTS $M'_n [M(S_2C=X)_y]$

| Example No. | X | n | y | M' | M | Physical Characteristics [1] |
|---|---|---|---|---|---|---|
| 1 | CHNO$_2$ | 2 | 2 | $(C_4H_9)_4N$ | Zn | M.P. 72–3° C., orange crystals (ethanol-water). |
| 2 | CHNO$_2$ | 2 | 2 | $(C_3H_7)_4N$ | Zn | M.P. 164° C. (dec.), orange-gold needles (acetone-hexane). |
| 3 | CHNO$_2$ | 2 | 2 | $(C_4H_9)_4N$ | Ni | M.P. 117° C., purple needles (acetone). |
| 4 | CHNO$_2$ | 2 | 2 | $(C_4H_9)_4N$ | Cu | M.P. 125–35° C., red-brown crystal-line solid (acetone-hexane). |
| 5 | CHNO$_2$ | 3 | 3 | $(C_4H_9)_4N$ | Cr | Oil (black), neutralization equivalent (HClO$_4$), 379 (392). |
| 6 | CHNO$_2$ | 1 | 2 | Co | Co | Black solid. |
| 7 | CHNO$_2$ | 1 | 2 | Zn | Zn | Do. |
| 8 | CHNO$_2$ | 1 | 2 | Cu | Cu | Do. |
| 9 | CHNO$_2$ | 1 | 2 | Cu | Zn | Do. |
| 10 | CHNO$_2$ | 1 | 2 | Zn | Cu | Do. |
| 11 | CHNO$_2$ | 1 | 2 | Mn | Mn | Red-brown solid. |
| 12 | CHNO$_2$ | 1 | 2 | Mn | Zn | Black solid. |
| 13 | CHNO$_2$ | 2 | 2 | K | Ni | Do. |
| 14 | CHNO$_2$ | 2 | 2 | H | Zn | Red solid. |
| 15 | C(CN)$_2$ | 2 | 2 | K | Zn | Tan solid. |
| 16 | C(CN)$_2$ | 1 | 2 | Cu | Cu | Black solid. |
| 17 | C(CN)$_2$ | 2 | 2 | $(C_4H_9)_4N$ | Zn | M.P. 146–8° C., yellow needles (ethanol). |
| 18 | C(CN)$_2$ | 2 | 2 | $(C_4H_9)_3N$ | Cu | M.P. 170–3° C., red-black crystals (acetone-ethanol). |
| 19 | C(CN)$_2$ | 2 | 2 | $(C_4H_9)_4N$ | Ni | M.P. 173–4° C., black needles (ethanol-acetone). |
| 20 | C(CN)$_2$ | 2 | 2 | $(C_4H_9)_4N$ | Co | M.P. 157–64° C., brown solid. |
| 21 | C(CN)$_2$ | 3 | 3 | $(C_4H_9)_4N$ | Cr | M.P. 140–5° C., light green solid. |
| 22 | C(CN)$_2$ | 3 | 3 | $(C_4H_9)_4N$ | Fe | M.P. 130–2° C., black solid. |
| 23 | C(CN)CO$_2$C$_2$H$_5$ | 2 | 2 | $(C_4H_9)_4N$ | Zn | M.P. 68–78° C., slightly yellow solid. |
| 24 | C(CN)CO$_2$C$_2$H$_5$ | 2 | 2 | $(C_3H_7)_4N$ | Zn | M.P. 147–53° C., slightly yellow solid. |
| 25 | C(CN)CONH$_2$ | 2 | 2 | $(C_3H_7)_4N$ | Zn | M.P. 160–5° C., white solid. |
| 26 | N-CN | 2 | 2 | $(C_4H_9)_4N$ | Zn | M.P. 115–18° C., white solid. |
| 27 | N-CN | 2 | 2 | $(C_3H_7)_4N$ | Zn | M.P. 194–5° C., white solid. |

[1] M.P.=Melting point.

TABLE II $M'_n [M(S_2C=X)_y]$

| Ex. No. | Empirical Formula | C | H | N | S | Metal |
|---|---|---|---|---|---|---|
| 1 | $C_{36}H_{74}N_4O_4S_4Zn$ | 52.33 (52.5) | 8.95 (9.0) | 6.51 (6.8) | 15.04 (15.5) | Zn, 7.79 (7.9). |
| 2 | $C_{28}H_{58}N_4O_4S_4Zn$ | 47.31 (47.5) | 8.18 (8.2) | 7.77 (7.9) | 18.25 (18.1) | Zn, 9.25 (9.2). |
| 3 | $C_{36}H_{74}N_4NiO_4S_4$ | 53.06 (53.2) | 9.01 (9.1) | 6.80 (6.9) | 15.43 (15.7) | Ni, 6.83 (7.25). |
| 4 | $C_{36}CuH_{74}N_4O_4S_4$ | 51.16 (52.9) | 8.76 (9.1) | 6.20 (6.85) | 15.74 (15.7) | Cu, 9.6 (7.8). |
| 5 | $C_{54}H_{111}CrN_6O_6S_6$ | 57.70 (54.9) | 10.23 (9.4) | 7.05 (7.1) | 16.93 (16.2) | |
| 6 | $C_4H_2N_2O_4S_4Co_2$ | 7.98 (12.4) | 1.69 (0.5) | 4.14 (7.2) | | |
| 7 | $C_4H_2N_2O_4S_4Zn_2$ | 11.25 (12.0) | 1.09 (0.5) | 5.41 (7.0) | 28.74 (32.0) | Zn, 29.4 (32.5). |
| 8 | $C_4H_2N_2O_4S_4Cu_2$ | 11.70 (12.1) | 1.01 (0.5) | 5.55 (7.1) | 32.16 (32.2) | Cu, 28.20 (32.0). |
| 9 | $C_4H_2N_2O_4S_4Zn\cdot Cu$ | 12.23 (12.0) | 0.59 (0.5) | 5.79 (7.0) | 30.20 (32.0) | Cu, 18.68 (15.9); Zn, 17.37 (16.4). |
| 10 | $C_4H_2CuN_2O_4S_4Zn$ | 12.34 (12.0) | 0.62 (0.5) | 5.66 (7.0) | 31.84 (32.0) | Cu, 19.2 (15.9); Zn, 29.4 (16.4). |
| 11 | $C_4H_2N_2O_4S_4Mn_2$ | 10.69 (12.6) | 1.25 (0.53) | 3.22 (7.4) | | Mn, 31.05 (28.9). |
| 12 | $C_4H_2N_2O_4S_4Zn\cdot Mn$ | 12.21 (12.3) | 0.59 (0.51) | 4.03 (7.2) | 28.83 (32.8) | Mn, 7.91 (14.1); Zn, 24.07 (16.8). |
| 13 | $C_4H_2N_2NiO_4S_4K_2$ | 15.74 (11.8) | 0.70 (0.5) | 5.88 (6.9) | 27.01 (31.5) | Ni, 19.55 (14.4); K, 14.1 (19.2). |
| 14 | $C_4H_4N_2O_4S_4Zn$ | 14.54 (14.2) | 1.1 (1.2) | 7.14 (8.3) | 39.17 (38.0) | Zn, 15.54 (19.4). |
| 15 | $C_8N_4S_4ZnK_2$ | 22.75 (22.65) | Nil (Nil) | 12.38 (13.2) | 28.78 (30.3) | Zn, 14.91 (15.5); K, 15.8 (18.4). |
| 16 | $C_8N_4S_4Cu_2$ | 22.41 (23.6) | Nil (Nil) | 12.22 (13.8) | 27.36 (31.6) | Cu, 28.9 (31.2). |
| 17 | $C_{40}H_{72}N_6S_4Zn$ | 58.13 (58.0) | 8.85 (8.7) | 9.70 (10.1) | 15.23 (15.4) | Zn, 7.80 (7.9). |
| 18 | $C_{40}H_{72}CuN_6S_4$ | 57.89 (58.0) | 8.90 (8.7) | 9.99 (10.2) | 15.05 (15.5) | Cu, 7.38 (7.7). |
| 19 | $C_{40}H_{72}N_6NiS_4$ | 58.53 (58.4) | 8.93 (8.9) | 10.01 (10.2) | 15.20 (15.6) | Ni, 7.11 (7.2). |
| 20 | $C_{40}H_{72}CoN_6S_4$ | 57.49 (58.4) | 8.80 (8.9) | 9.70 (10.2) | 15.24 (15.6) | |
| 21 | $C_{60}H_{108}CrN_9S_6$ | 60.03 (60.0) | 9.25 (9.0) | 10.35 (10.5) | 14.33 (16.0) | |
| 22 | $C_{60}H_{108}FeN_9S_6$ | 60.03 (60.0) | 9.16 (9.0) | 10.40 (10.5) | 15.67 (16.0) | Fe, 4.3 (4.7). |
| 23 | $C_{44}H_{82}N_4O_4S_4Zn$ | 57.39 (57.4) | 9.13 (9.20) | 5.76 (6.1) | 14.07 (13.9) | Zn, 6.85 (7.1). |
| 24 | $C_{36}H_{66}N_4O_4S_4Zn$ | 51.89 (53.3) | 7.96 (8.1) | 6.39 (6.9) | 14.45 (15.8) | Zn, 7.69 (8.1). |
| 25 | $C_{32}H_{60}N_6O_2S_4Zn$ | 49.68 (51.0) | 8.01 (8.00) | 10.84 (11.2) | 17.26 (17.0) | Zn, 9.1 (8.7). |
| 26 | $C_{36}H_{72}N_6S_4Zn$ | 54.74 (55.3) | 9.25 (9.2) | 10.62 (10.8) | 15.99 (14.5) | Zn, 8.11 (8.4). |
| 27 | $C_{28}H_{56}N_6S_4Zn$ | 50.32 (50.2) | 8.59 (8.4) | 12.25 (12.5) | 18.30 (19.1) | Zn, 10.09 (9.8). |

[1] The number within the parenthesis represents the calculated theoretical value.

The 1,1-dimercaptomethylene derivatives of this invention possess biocidal properties and in this respect are especially useful as agricultural fungicides. As such, they are particularly valuable when disseminated as fungicidal compositions. Such compositions normally comprise an agronomically acceptable carrier having incorporated therein one or more of the 1,1-dimercaptomethylene derivatives disclosed as the active agent or agents. Where necessary, surfactants or other additives may be incorporated to give uniformly formulated mixtures. By "agronomically acceptable carrier" is meant any substance which can be used to dissolve, dispense or diffuse the toxic agent to be used therein without impairing its effectiveness and which does no permanent damage to such environment as soil, equipment and agronomic crops.

For use as pesticides, the compounds of this invention are usually taken up in an agronomically acceptable carrier or formulated so as to render them suitable for subsequent dissemination. For example, the 1,1-dimercaptomethylene derivatives may be formulated as wettable powders, emulsion concentrates, dusts, granular formulations, aerosols or flowable emulsion concentrates. In such formulations, the 1,1-dimercaptomethylene derivatives are extended with a liquor or solid carrier and, when desired, suitable surfactants are incorporated.

Compounds of this invention may be dissolved in a water-miscible liquid such as ethanol, isopropanol, acetone, and the like. Such solutions are easily extended with water.

The 1,1-dimercaptomethylene derivatives may be taken up on or mixed with a finely particled solid carrier, as for example, clays, inorganic silicates, carbonates, and silicas. Organic carriers may also be employed. Dust concentrates are commonly made wherein 1,1-dimercaptomethylene derivatives are present in the range of 20 to 80%. For ultimate application these concentrates are normally extended with additional solid from about 1 to 20%.

Wettable powder formulations are made by incorporating the compounds of this invention in an inert, finely divided solid carrier along with a surfactant which may be one or more emulsifying, wetting, dispersing or spreading agents or blend of these. The 1,1-dimercaptomethylene derivatives are usually present in the range of 10 to 80% by weight and the surfactants in from 0.5 to 10% by weight. Commonly used emulsifying and wetting agents include polyoxyethylated derivatives of alkylphenols, fatty alcohols, fatty acids, and alkylamines; alkylarene sulfonates and dialkyl sulfosuccinates. Spreading agents include such materials as glycerol mannitan laurate and a condensate of polyglycerol and oleic acid modified with phthalic anhydride. Dispersing agents include such materials as the sodium salt of the copolymer of maleic anhydride and an olefin such as diisobutylene, sodium lignin sulfonate and sodium formaldehydenaphthalene sulfonates.

One convenient method for preparing a solid formulation is to impregnate the 1,1-dimercaptomethylene derivatives toxicant onto the solid carrier by means of a volatile solvent, such as acetone. In this manner, adjuvants, such as activators, adhesives, plant nutrients, synergists and various surfactants, may also be incorporated.

Emulsion concentrate formulations may be made by dissolving the 1,1-dimercaptomethylene derivatives of this invention in an agronomically acceptable organic solvent and adding a solvent-soluble emulsifying agent. Suitable solvents are usually water-immiscible and may be found in the hydrocarbon, chlorinated hydrocarbon, ketone, ester, alcohol and amide classes of organic solvents. Mixtures of solvents are commonly employed. The surfactants useful as emulsifying agents may constitute about 0.5% to 10% by weight of the emulsion concentrate and may be anionic, cationic or non-ionic in character. Anionic surfactants include alcohol sulfates or sulfonates, alkylarene sulfonates and sulfosuccinates. Cationic surfactants include fatty acid alkyl amine salts and fatty acid alkyl quaternaries. Non-ionic emulsifying agents include ethylene oxide adducts of alkylphenols, fatty alcohols, mercaptans and fatty acids. The concentration of the active ingredients may vary from 10 to 80%, preferably in the range of 25 to 50%.

For use as pesticides, these compounds should be applied in an effective amount sufficient to exert the desired biocidal activity by techniques well known in the art. Usually, this will involve the application of the 1,1-dimercaptomethylene derivatives to the loci to be protected in an effective amount when incorporated in an agronomically acceptable carrier.

Dilute sprays may be applied at concentrations of 0.05 to 20 pounds of the active ingredient per 100 gallons of spray. They are usually applied at 0.1 to 10 pounds per 100 gallons and preferably at 0.125 to 5 pounds per 100 gallons. In more concentrated sprays, the active ingredient is increased by a factor of 2 to 12. With dilute sprays, applications are usually made to the plants until run-off is achieved, whereas with more concentrated sprays the materials are applied as mists.

The compounds of this invention may be used as the sole pesticidal agents or they may be used in conjunction with other fungicides or with insecticides, miticides and comparable pesticides.

The 1,1-dimercaptomethylene derivatives of this invention were evaluated as fungicides by the standard slide spore germination test (cf. Phytopathology, 33, 627 (1943), utilizing spores of *Alternaria solani* (Alt.), *Schlerotinia fructicola* (Scl.) and *Stemphylium sarcinaeforme* (Stem.) The values obtained for the concentration in parts per million (p.p.m.) which effectively controlled 50% of the spores ($ED_{50}$) are given in Table III.

TABLE III.—FUNGITOXICITIES OF 1,1-DIMERCAPTO METHYLENE DERIVATIVES

| | $ED_{50}$ (p.p.m.) | | |
|---|---|---|---|
| | Alt. | Scl. | Stem. |
| Example No.: | | | |
| 1 | 10-50 | 10-50 | 10-50 |
| 2 | 10-50 | 1-10 | 10-50 |
| 3 | 10-50 | 1-10 | 1-10 |
| 4 | 10-50 | 10-50 | 50-200 |
| 5 | 50-200 | 50-200 | 200 |
| 6 | 200-1,000 | >1,000 | 200-1,000 |
| 7 | 10-50 | 10-50 | 10-50 |
| 8 | 10-50 | 50-200 | 10-50 |
| 9 | 1,000 | 200-1,000 | 200-1,000 |
| 10 | 200-1,000 | 200-1,000 | 50-200 |
| 11 | 50-200 | 50-200 | 50-200 |
| 12 | 200-1,000 | 200-1,000 | 1-10 |
| 13 | 1-10 | 10-50 | 10-50 |
| 14 | | | |
| 15 | 1-10 | 10-50 | 1-10 |
| 16 | >1,000 | >1,000 | >1,000 |
| 17 | >1,000 | >1,000 | >1,000 |
| 18 | >1,000 | >1,000 | >1,000 |
| 19 | >1,000 | >1,000 | >1,000 |
| 20 | 200-1,000 | >1,000 | >1,000 |
| 21 | >1,000 | 200-1,000 | >1,000 |
| 22 | >1,000 | 50-200 | >1,000 |
| 23 | 1-10 | >1,000 | 10-50 |
| 24 | 1-10 | <1 | 10-50 |
| 25 | 50-200 | 50-200 | 50-200 |
| 26 | 10-50 | 50-200 | 10-50 |
| 27 | 1-10 | 10-50 | 10-50 |

In addition to the standard slide spore germination test, typical compounds of this invention were evaluated for their ability to control several common plant diseases which cause extensive damage to agronomic corps.

Greenhouse tests were run to determine the value of representative compounds of this invention for the control of *Peronospora parasitica*, the causal agent of downy mildew of broccoli and other crucifers. In this test, six-week old broccoli plants were sprayed with aqueous suspensions of the test chemicals, dried, then weathered in a fog chamber overnight. The dried plants were inoculated with an aqueous suspension of *Peronospora parasitica* sporangia containing 15,000 sporangia per milliliter and incubated at 53° F. for about 40 hours. Plants not treated with chemicals were included for check purposes. All plants were then placed on a greenhouse bench and stored at about 70° F. to allow disease lesions to develop and 6 to 8 days later the lesions were counted. Compounds of Examples 8, 13, 15, 23, and 24 exhibited fair to excellent control of the downy mildew.

Greenhouse tests were also run to determine whether specimen 1,1-dimecraptomethylene derivatives could check rice blast caused by *Piricularia oryzae*. Fair to good control was obtained with the compounds of Examples 1, 2, 3, 7, 11, 13, 23, 24, 26, and 27. Such control was obtained at a dosage suitable for commercial use.

Representative compounds of this invention also exhibited substantial control in greenhouse tests of early and late blight of tomatoes caused by *Alternaria solani* and *Phytophthora infestans* respectively. The 1,1-dimercaptomethylene derivatives of Examples 3, 4, and 8 were particularly noteworthy in this respect.

We claim:
1. A compound of the formula

$$M'_n[M(S_2C=X)_y]$$

wherein:

X is the group $(CHNO_2)$, $(C(CN)_2)$, $(C(CN)CO_2C_2H_5)$, $(C(CN)CONH_2)$ $(C(CO_2C_2H_5)_2)$, $(C(CONH_2)_2)$, or $(N-CN)$;

M is zinc, copper, nickel, cobalt, iron, or chromium;
M' is hydrogen, cobalt, copper, manganese, nickel, potassium, zinc, or tetraalkylammonium wherein the alkyl contains 1 to 8 carbon atoms;
y is the integer 2 or 3; and
n is an integer from 1 to 3.

2. A compound according to claim 1 wherein said compound is tetrabutylammonium bis-(2-nitroethylene-1,1-dithiolato)-Zn(II).

3. A compound according to claim 1 wherein said compound is zinc bis-(2-nitroethylene-1,1-dithiolato)-Zn(II).

4. A compound according to claim 1 wherein said compound is potassium bis-(2,2-dicyanoethylene-1,1-dithiolato)-Zn(II).

5. A compound according to claim 1 wherein said compound is tetrabutylammonium bis-(2-cyano-2-carboethoxyethylene-1,1-dithiolato)-Zn(II).

6. A compound according to claim 1 wherein said compound is tetrapropylammonium bis-(2-cyano-2-carboethoxyethylene-1,1-dithiolato)-Zn(II).

7. A compound of the formula $$M'_n[M(S_2C=X)_y]$$

wherein:

X is the group $(CHNO_2)$, $(C(CN)_2)$, $(C(CN)CO_2C_2H_5)$, $(C(CN)CONH_2)$ $(C(CO_2C_2H_5)_2)$, $(C(CONH_2)_2)$, or $(N-CN)$;

M is zinc, copper, nickel, cobalt, iron, or chromium;
M' is cobalt, copper, manganese, nickel, potassium, zinc, or tetraalkylammonium wherein the alkyl contains 1 to 8 carbon atoms, M' being different from M;
y is the integer 2 or 3; and
n is an integer from 1 to 3.

References Cited

UNITED STATES PATENTS

| 2,495,322 | 1/1950 | Gilbert et al. | 260—429.9 |
| 3,122,472 | 2/1964 | Waritz | 167—22 |
| 3,255,195 | 6/1966 | Benson | 260—270 |

FOREIGN PATENTS

| 1,441,120 | 4/1966 | France. |

TOBIAS E. LEVOW, *Primary Examiner.*

H. M. S. SNEED, *Assistant Examiner.*

U.S. Cl. X.R.

260—429, 438.1, 438.5, 439; 424—287, 289, 294, 295